UNITED STATES PATENT OFFICE.

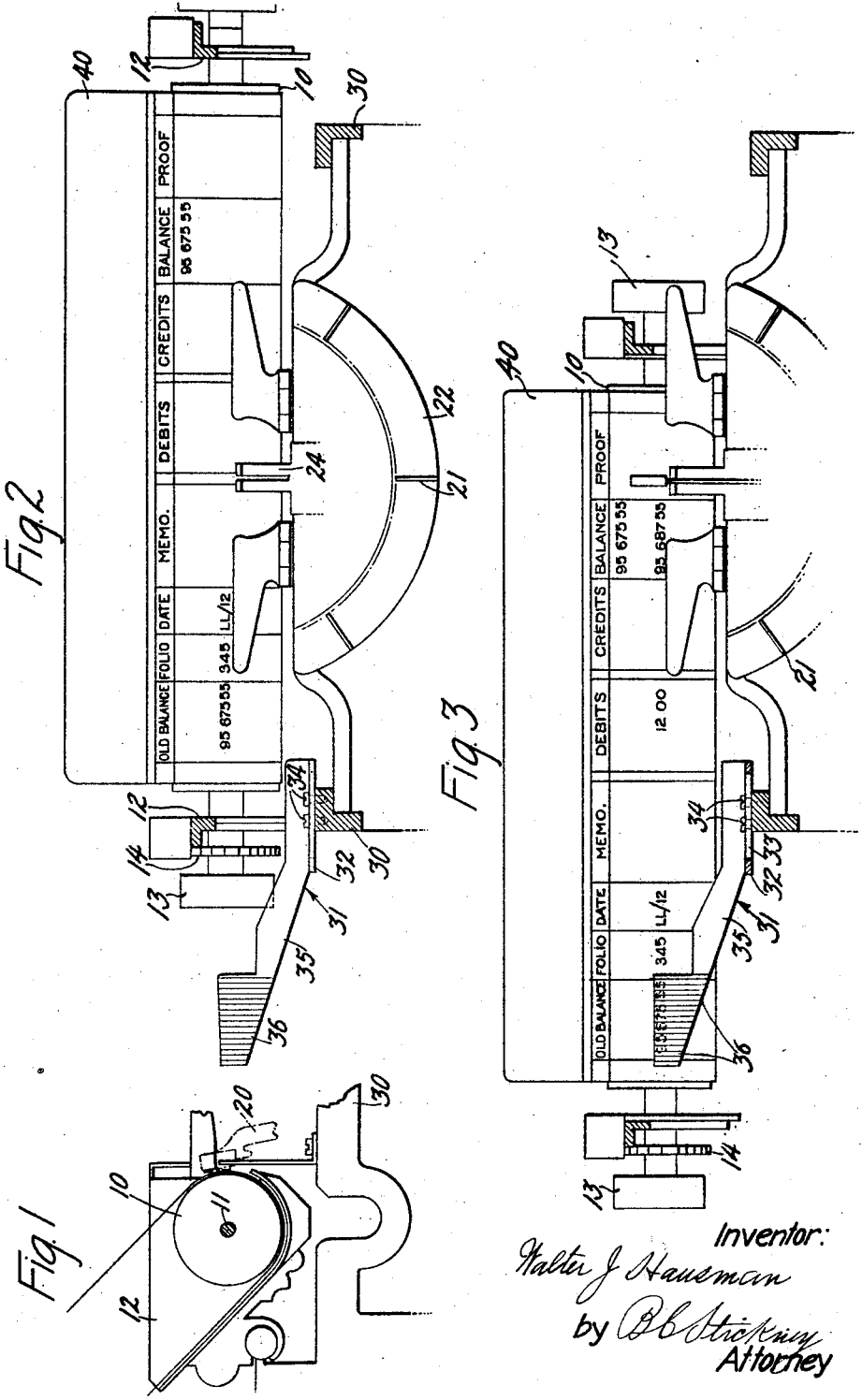

WALTER J. HAUSMAN, OF ST. LOUIS, MISSOURI, ASSIGNOR TO UNDERWOOD COMPUTING MACHINE COMPANY, OF NEW YORK, N. Y., A CORPORATION OF NEW YORK.

COMBINED TYPEWRITING AND COMPUTING MACHINE.

1,416,023.      Specification of Letters Patent.    Patented May 16, 1922.

Application filed January 6, 1921. Serial No. 435,326.

*To all whom it may concern:*

Be it known that I, WALTER J. HAUSMAN, a citizen of the United States, residing in St. Louis, in the city of St. Louis and State of Missouri, have invented certain new and useful Improvements in Combined Typewriting and Computing Machines, of which the following is a specification.

This invention relates to improvements in combined typewriting and computing machines of the Underwood-Hanson type, and is shown as applied to a machine equipped with a plurality of registers, as in the patent to Hart, No. 1,270,411, dated June 25, 1918, one of which may be used as a main computing register and another simply as a proving register.

It is customary to insert in the machine a ledger-sheet carrying a customer's account and showing the balance in favor of the dealer in one of the columns near the right-hand end, headed "Balance." In order to run this balance into the computing register, the old balance is copied and typed in the first column of the ledger-sheet, adjoining the left-hand edge. The old balance is also simultaneously run into the proving register. There are then typed in the other columns the debits or credits, which are added or subtracted in the computing register to give a new balance; but these items do not affect the proving register, which still contains the old balance. The new balance is then typed in the "balance" column, and simultaneously subtracted out of the computing register. The "star" key may then be operated to type the star, thereby showing that the computing register stands at zero. (See patent to Hart, No. 1,190,287, dated July 11, 1916.)

In the last column near the right-hand edge, there is adapted to be typed, for proving purposes, the old balance with which the day's computations were begun, at the same time subtracting said balance out of the proving register. Assume the old balance to be incorrectly typed in the "old balance" column, and hence incorrectly run into the computing and proving registers. If the operator looks into the "old balance" column and types the amount found there, he will subtract out of the proving register the same amount which was originally run in, and the star can be printed even though the amount was incorrectly copied originally. This invention, therefore, provides a blind or screen for covering up the amount in the "old balance" column, so that it is necessary to go to the original "balance" column to get the amount. Since the operator is not likely to make the same error twice in copying from the same amount, a different amount will then be typed than that contained in the proving register. The star key cannot be operated and the error becomes apparent. The shutter means comprises a member fixed to the machine in such manner as to become effective when the final right-hand column of the ledger-sheet is in position to be typed.

Since there is subtracted out of the computing register the exact amount found therein, the star can be printed even though the computation began with an incorrect old balance. In typing the old balance for proving purposes, the amount is read from the "balance" column and not from the proving register or the "old balance" column.

Other features and advantages will hereinafter appear.

In the accompanying drawings,

Figure 1 is an end view showing the invention applied to a typewriting and computing machine, only the necessary cooperating parts of the machine being shown.

Figure 2 is a front view of the device, shown in Figure 2, showing the ledger-sheet in position and the various columns on said sheet.

Figure 3 is a view similar to Figure 2, showing the carriage at the left end of its travel and the screen in effective relation thereto.

A platen 10 is fixed on a shaft 11, journaled in the end walls 12 of the typewriter carriage frame. Said platen is rotatable by finger-wheel 13 outside said walls 12 and by a slide and pawl (not shown) operating the ratchet-wheel 14 fixed to move with the platen shaft. Type-bars 20 are adapted to be swung upwardly and rearwardly by keys (not shown) against said platen, being guided in slots 21 in a segment 22 and by typeguide 24 fixed to said segment. The structure thus far described is found in the Underwood standard typewriters and combined typewriting and computing machines.

A ledger-sheet 40 is shown in position around the platen. The sheet comprises a column for old balances, columns for miscellaneous data, columns for debits and credits, a column for the new balance, and, in this case, there is also a "proof" column. As pointed out above, this ledger-sheet is for use in a machine of the type described in said Hart Patent, No. 1,270,411, having a computing register and a proving register, which registers can be set to operate together or separately.

Let it be assumed that the balance carried over as shown in the "balance" column is 95675.55. The "old balance" column is brought to the printing point and 95675.55 is typed therein and run into both the computing and proving registers. The carriage is then moved toward the left and the item 12.00 is typed in the "debits" column and run into the computing register, which now stands at 95687.55, but not into the proving register which still reads 95675.55. There being no other items to enter, the carriage is then moved over to bring the "balance" column in printing position, and the new balance, as shown by the computing register, is typed therein and simultaneously subtracted out of the computing register, which now stands at zero. The star key associated with the computing register may now be depressed for checking purposes.

The carriage is again moved towards the left, bringing the "proof" column to the printing point. The proving register contains the old balance as copied into the "old balance" column from the original "balance" column. The operator should now go back to the original balance 95675.55 in the "balance" column, copying that figure in the "proof" column and simultaneously subtracting it out of the proving register. If the operator copied the above amount correctly into the "old balance" column, and hence into the proving register, upon recopying this amount and subtracting it out of the proving register, the latter will stand at zero and the star key may be operated. It is essential that the operator read the old balance from the "balance" column and not from the "old balance" column, for, if a mistake were made in copying the old balance into the "old balance" column, the same mistake would be entered into the proving register. If the operator types the incorrect amount of the "old balance" column in the "proof" column, the proving register will stand at zero when that amount is subtracted out, even though the old balance was incorrectly copied. However, if the operator copies the old balance from the "balance" column, the discrepancy between this amount and the incorrect amount in the "old balance" column and the proving register will become apparent, for, upon subtraction, the proving register will not stand at zero and the star key will not be capable of operation. It is, therefore, essential that the operator copy the old balance from the "balance" column for typing in the "proof" column and subtracting from the proving register, and not from the "old balance" column.

The means provided for covering up the amount in the "old balance" column, when the carriage is in position to type in the "proof" column, comprises a bracket 31 fixed to one of the side members 30 of the machine. Said bracket is provided with a horizontal portion 32, provided with a slot 33 through which pass screws 34 for fastening the bracket to the side member. The slot enables the bracket to be adjusted laterally of the machine. The bracket 31 comprises also an elongated upwardly-extending arm 35 with an end piece 36, painted red and adapted to extend above the printing line, as shown in Figure 3. The end piece, or blind, 36 covers the item in the "old balance" column when the carriage is in position to print in the "proof" column. The operator is then compelled to go to the "balance" column and copy the original old balance.

Variations may be resorted to within the scope of the invention, and portions of the improvements may be used without others.

Having thus described my invention, I claim:

1. In a combined typewriting and computing machine having a computing register and a proving register, and comprising a carriage having a platen journaled therein and around which a ledger-sheet is adapted to be fed, said ledger-sheet having an "old balance" column adjacent the left side edge thereof, a "balance" column near the right side edge, and a "proof" column adjacent the "balance" column, the amount in said "balance" column at the beginning of a computation being adapted to be copied into said "old balance" column and run into said computing and proving registers, the same amount being adapted to be copied into said "proof" column and subtracted out of the proving register to ascertain whether the amount in the "old balance" column was correctly copied at the beginning of the computation, a screen mounted on said machine and adapted to blind the amount in the "old balance" column, so that the amount typed into the "proof" column and subtracted from the proving register will be copied from the original "balance" column to avoid carrying over any mistake which might have been made in copying the amount into the "old balance" column.

2. In a combined typewriting and computing machine having a computing register and a proving register, and comprising a carriage having a platen journaled therein and around which a ledger-sheet is adapted to be fed, said ledger-sheet having an "old balance" column adjacent the left side edge thereof, a "balance" column near the right side edge, and a "proof" column adjacent the "balance" column, the amount in said "balance" column at the beginning of a computation being adapted to be copied into said "old balance" column and run into said computing and proving registers, the same amount being adapted to be copied into said "proof" column and subtracted out of the proving register to ascertain whether the amount in the "old balance" column was correctly copied at the beginning of the computation, a screen mounted on said machine and adapted to blind the amount in the "old balance" column, so that the amount typed into the "proof" column and subtracted from the proving register will be copied from the original "balance" column to avoid carrying over any mistake which might have been made in copying the amount into the "old balance" column, said screen being adjustable laterally on said machine to bring it into co-operating relation with said "old balance" column when the "proof" column is in position to be typed.

3. In a combined typewriting and computing machine comprising a carriage having a platen journaled therein and around which a ledger-sheet is adapted to be fed, said ledger-sheet having an "old balance" column adjacent the left side edge thereof, a "balance" column near the right side edge, and a "proof" column adjacent said "balance" column, the amount in said "old balance" column being adapted to be copied from said "balance" column, the same amount being adapted to be copied into said "proof" column, means mounted on said machine for blinding the amount in said "old balance" column to necessitate copying said amount from said "balance" column when it is desired to enter the amount in the "proof" column.

4. In a combined typewriting and computing machine comprising a carriage having a platen journaled therein and around which a ledger-sheet is adapted to be fed, said ledger-sheet having an "old balance" column adjacent the left side edge thereof, a "balance" column near the right side edge, and a "proof" column adjacent said "balance" column, the amount in said "old balance" column being adapted to be copied from said "balance" column, the same amount being adapted to be copied into said "proof" column, a screen mounted on said machine for blinding the amount in said "old balance" column to necessitate copying said amount from said "balance" column when it is desired to enter the amount in the "proof" column.

5. In a combined typewriting and computing machine comprising a carriage having a platen journaled therein and around which a ledger-sheet is adapted to be fed, said ledger-sheet having an "old balance" column adjacent the left side edge thereof, a "balance" column near the right side edge, and a "proof" column adjacent said "balance" column, the amount in said "old balance" column being adapted to be copied from said "balance" column, the same amount being adapted to be copied into said "proof" column, a screen mounted on said machine for blinding the amount in said "old balance" column to necessitate copying said amount from said "balance" column when it is desired to enter the amount in the "proof" column, said screen being adjustable laterally on said machine to correspond to the position of the "old balance" column when the "proof" column is in position to be typed.

6. In a combined typewriting and computing machine comprising a carriage having a platen journaled therein and around which a ledger-sheet is adapted to be fed, said ledger-sheet having an "old balance" column adjacent the left side edge thereof, a "balance" column near the right side edge, and a "proof" column adjacent said "balance" column, the amount in said "old balance" column being adapted to be copied from said "balance" column, the same amount being adapted to be copied into said "proof" column, means on said machine for blinding the amount in said "old balance" column to necessitate copying said amount from said "balance" column when it is desired to enter the amount in the "proof" column, said means comprising a screen mounted on said machine and adapted to blind said "old balance" column when the "proof" column is in position to be typed.

7. In a combined typewriting and computing machine comprising a carriage having a platen journaled therein, and around which sheets are adapted to be fed, said carriage being adapted to travel from right to left, a screen mounted on said machine and extending toward the left above the printing line to cover matter typed on a sheet at the left end thereof and which it is desired should not be visible while typing matter at the right end.

8. In a combined typewriting and computing machine comprising a carriage having a platen journaled therein, and around which sheets are adapted to be fed, said carriage being adapted to travel from right to left, a screen mounted on said machine and extending toward the left above the printing line to cover matter typed on a sheet at the left end thereof and which it is desired should not be visible while typing matter at the right end, said screen being adjustable laterally on said machine to extend variable distances toward the left.

9. In a combined typewriting and computing machine comprising a carriage having a platen journaled therein and around which sheets are adapted to be fed, said carriage being adapted to travel from right to left, a bracket mounted on said machine having an arm extending outwardly toward the left, said arm terminating in a screen portion extending upwardly above the printing line to cover matter typed on a sheet at the left end thereof and which it is desired should not be visible while typing matter at the right end.

10. In a combined typewriting and computing machine comprising a carriage having a platen journaled therein, a device to insure proper proving of the computation of items entered on a ledger-sheet on said platen, said ledger-sheet having an "old balance" column adjacent the left side edge thereof, a "balance" column near the right side edge, and a "proof" column adjacent said "balance" column, the amount in said "old balance" column, in the line in which entries are being made, being copied from an amount in said "balance" column in a line previously written, the same amount being copied into said "proof" column in the line in which entries are being made, said device comprising means mounted on said machine for blinding said amount in the "old balance" column to necessitate copying said amount from said "balance" column when it is desired to enter the amount in the "proof" column.

11. In a combined typewriting and computing machine comprising a carriage having a platen journaled therein, a device to insure proper proving of the computation of items entered on a ledger-sheet on said platen, said ledger-sheet having an "old balance" column adjacent the left side edge thereof, a "balance" column near the right side edge, and a "proof" column adjacent said "balance" column, the amount in said "old balance" column, in the line in which entries are being made, being copied from an amount in said "balance" column in a line previously written, the same amount being copied into said "proof" column in the line in which entries are being made, said device comprising a screen on said machine for blinding the amount in said "old balance" column to necessitate copying said amount from said "balance" column when it is desired to enter the amount in the "proof" column.

12. In a combined typewriting and computing machine comprising a carriage having a platen journaled therein, a device to insure proper proving of the computation of items entered on a ledger-sheet on said platen, said ledger-sheet having an "old balance" column adjacent the left side edge thereof, a "balance" column near the right side edge, and a "proof" column adjacent said "balance" column, the amount in said "old balance" column, in the line in which entries are being made, being copied from an amount in said "balance" column in a line previously written, the same amount being copied into said "proof" column in the line in which entries are being made, said device comprising a screen on said machine for blinding the amount in said "old balance" column to necessitate copying said amount from said "balance" column when it is desired to enter the amount in the "proof" column, said screen being adjustable laterally on said machine to correspond to the position of the "old balance" column when the "proof" column is in position to be typed.

13. A device for use on a combined typewriting and computing machine having a computing register, a proving register and a carriage having a platen journaled therein to insure proper proving of the computation of items entered on a ledger-sheet on said platen, said ledger-sheet having an "old balance" column, a "balance" column, and a "proof" column adjacent the "balance" column, the amount in said "balance" column at the beginning of a computation being copied into said "old balance" column and run into said computing and proving registers, the same amount being copied into said "proof" column and subtracted out of the proving register to ascertain whether the amount in the "old balance" column was correctly copied at the beginning of the computation, said device comprising a screen fixed on said machine and adapted to blind the amount in the "old balance" column when the "proof" column is at the printing point, so that the amount typed in the "proof" column and substracted from the proving register will be copied from the original "balance" column to avoid carrying over any mistake which might have been made in copying the amount into the "old balance" column.

WALTER J. HAUSMAN.

Witnesses:
H. R. BROCH,
JOHN L. KICKHAM.